Sept. 20, 1938. O. F. PRESBREY 2,130,900
DYNAMOMETER OR/AND TESTING APPARATUS FOR MOTOR VEHICLES
Filed June 30, 1934 7 Sheets-Sheet 1
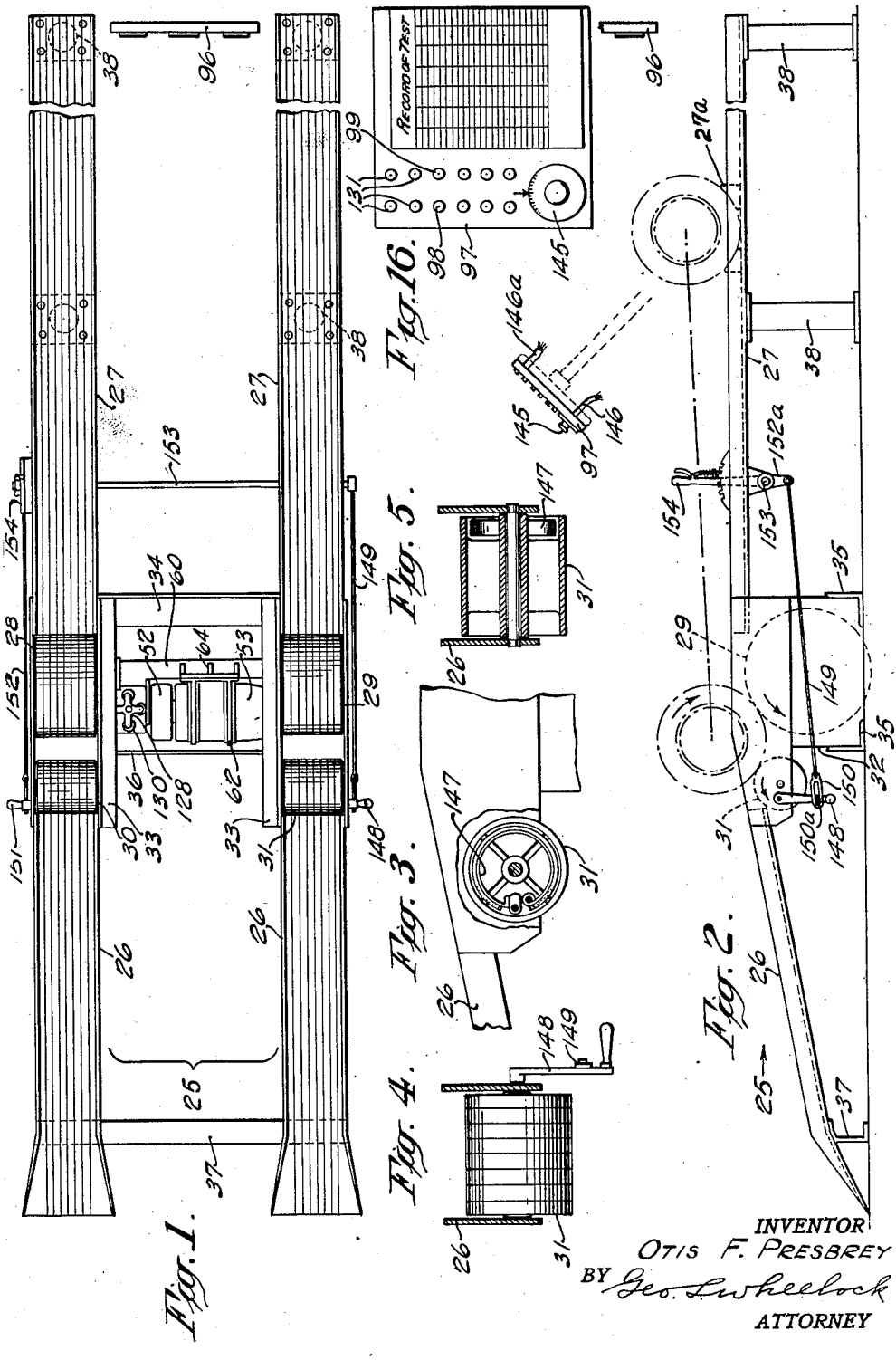
INVENTOR
OTIS F. PRESBREY
BY Geo. L. Wheelock
ATTORNEY Sept. 20, 1938. O. F. PRESBREY 2,130,900
DYNAMOMETER OR/AND TESTING APPARATUS FOR MOTOR VEHICLES
Filed June 30, 1934 7 Sheets-Sheet 2

INVENTOR
OTIS F. PRESBREY.
BY Geo. L. Wheelock
ATTORNEY

Sept. 20, 1938. O. F. PRESBREY 2,130,900
DYNAMOMETER OR/AND TESTING APPARATUS FOR MOTOR VEHICLES
Filed June 30, 1934 7 Sheets-Sheet 3
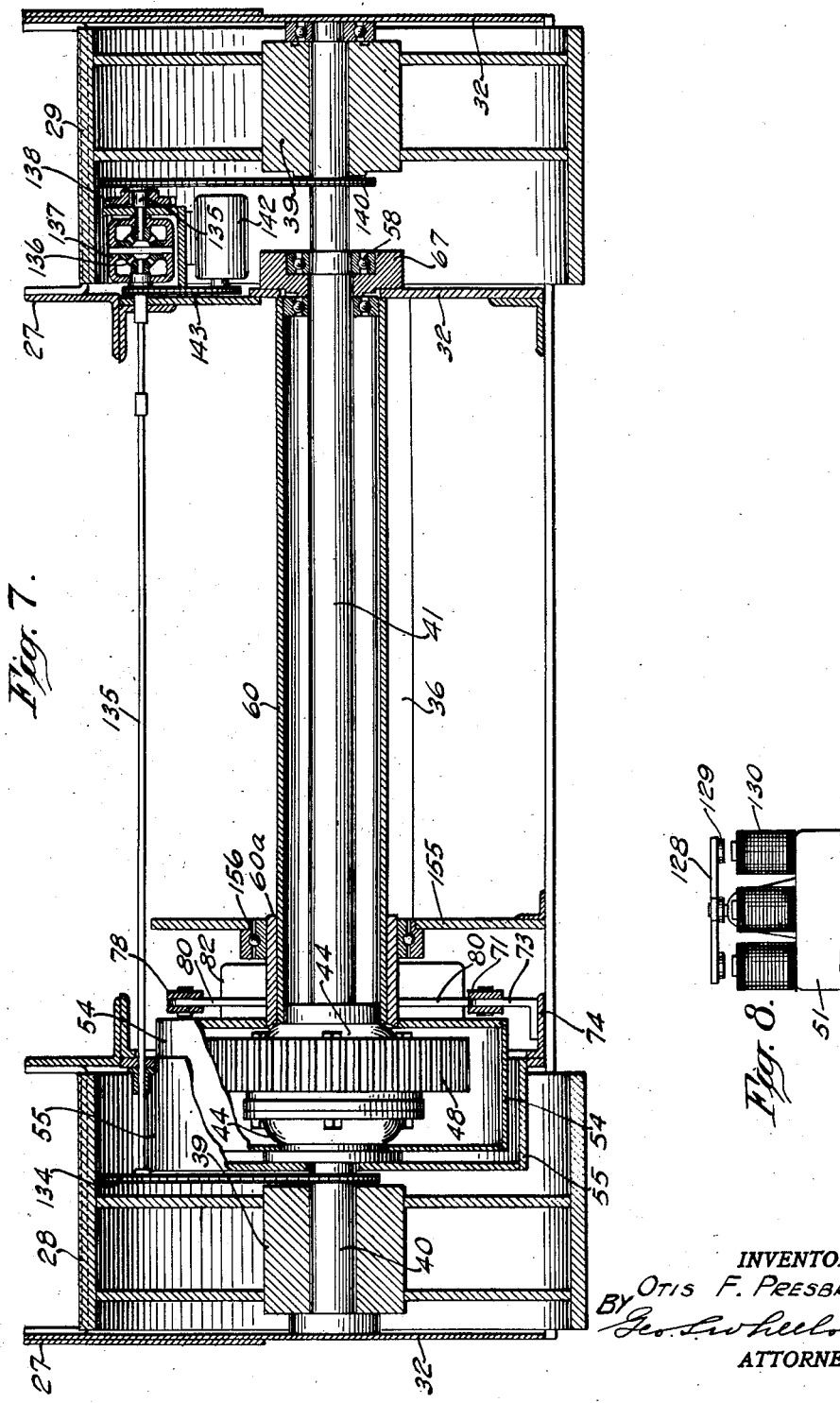
INVENTOR
OTIS F. PRESBREY
BY Geo. S. Wheelock
ATTORNEY

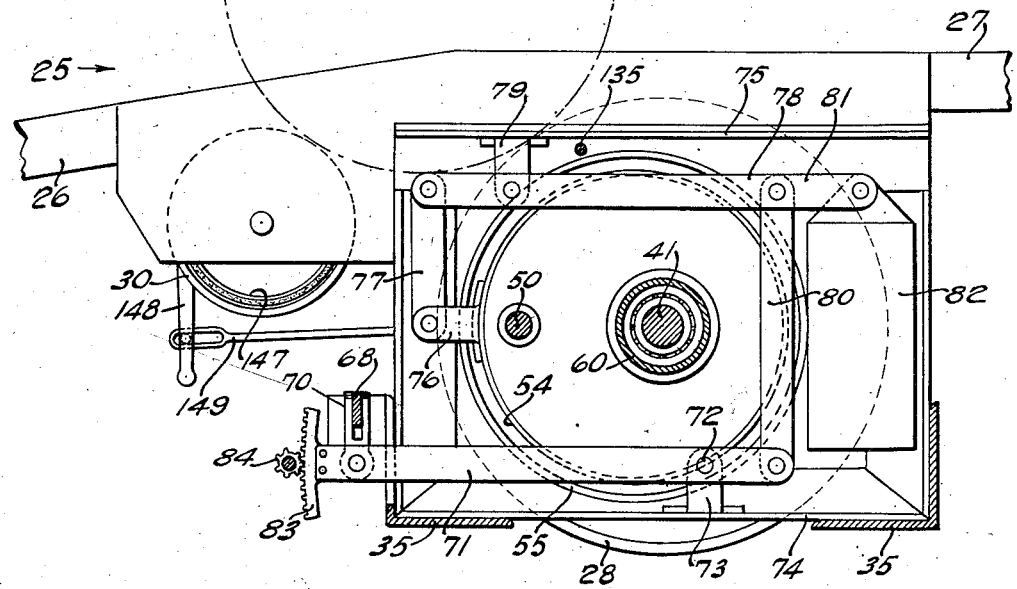
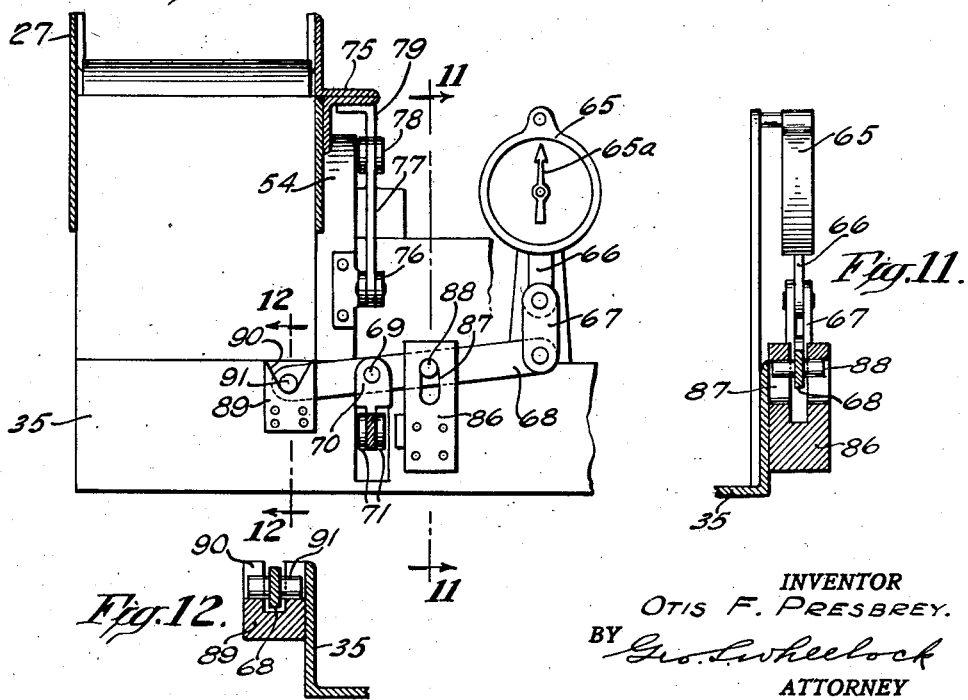

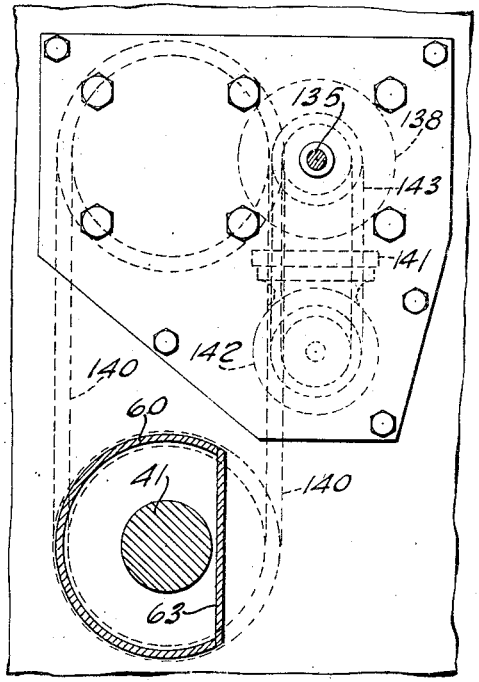
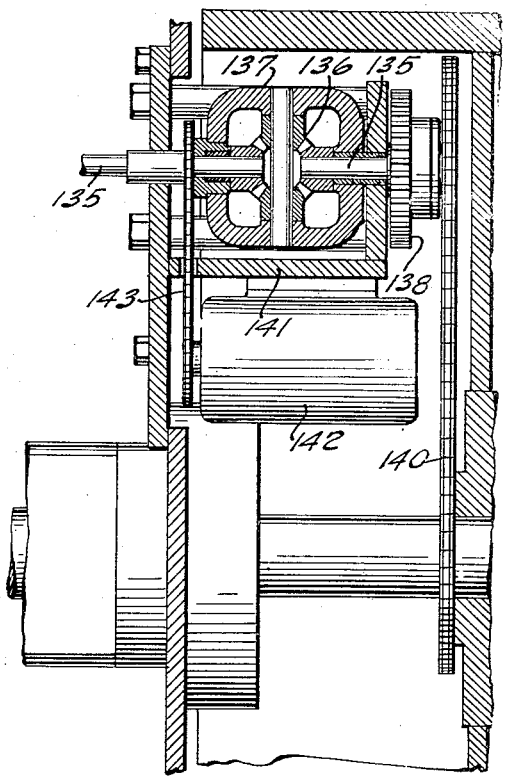
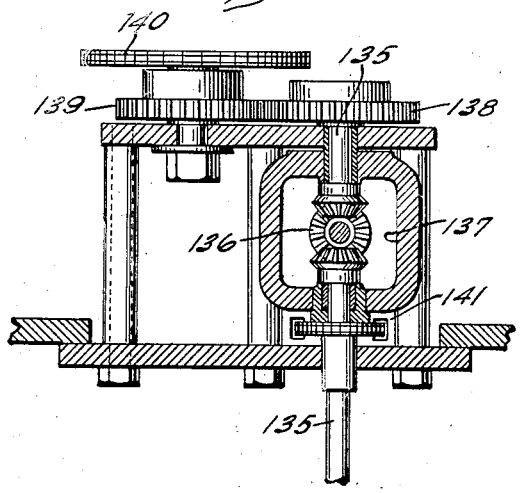

Sept. 20, 1938.  O. F. PRESBREY  2,130,900
DYNAMOMETER OR/AND TESTING APPARATUS FOR MOTOR VEHICLES
Filed June 30, 1934  7 Sheets-Sheet 6
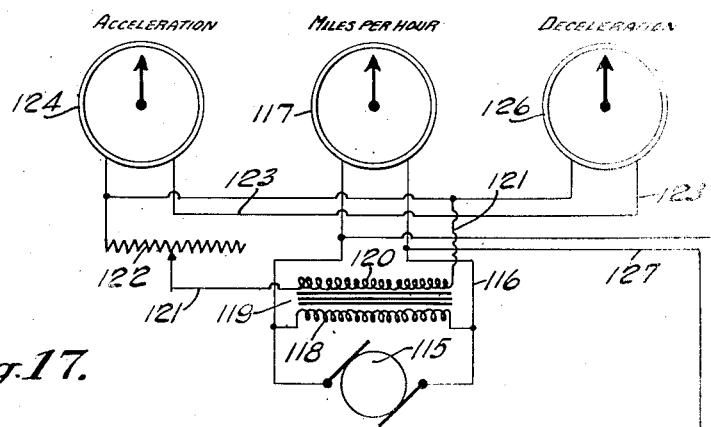
Fig. 17.
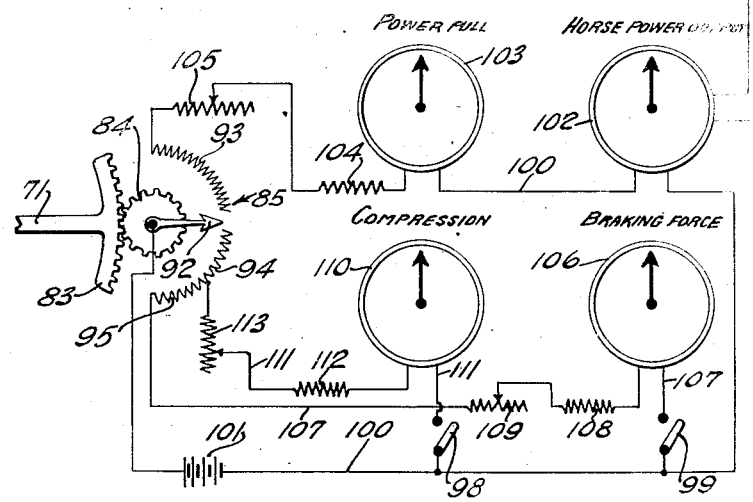
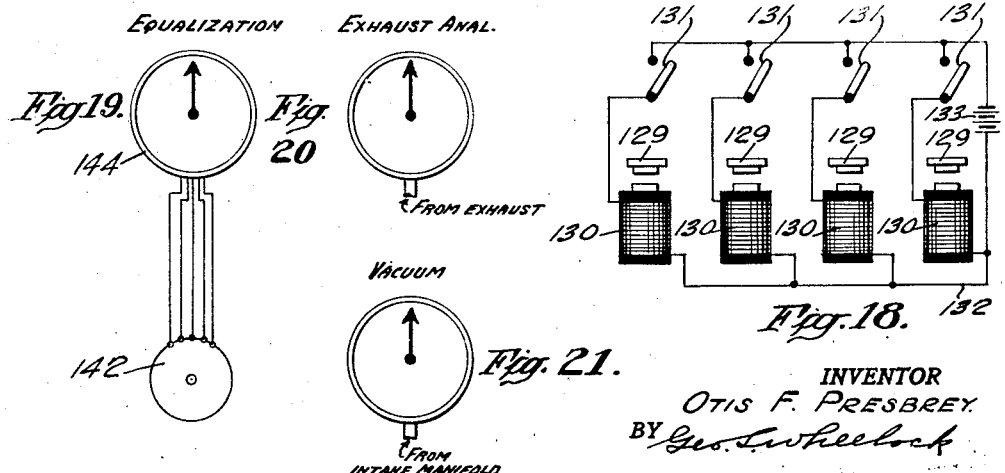
Fig. 19. Fig. 20. Fig. 21. Fig. 18.
INVENTOR
OTIS F. PRESBREY.
BY Geo. S. Wheelock
ATTORNEY

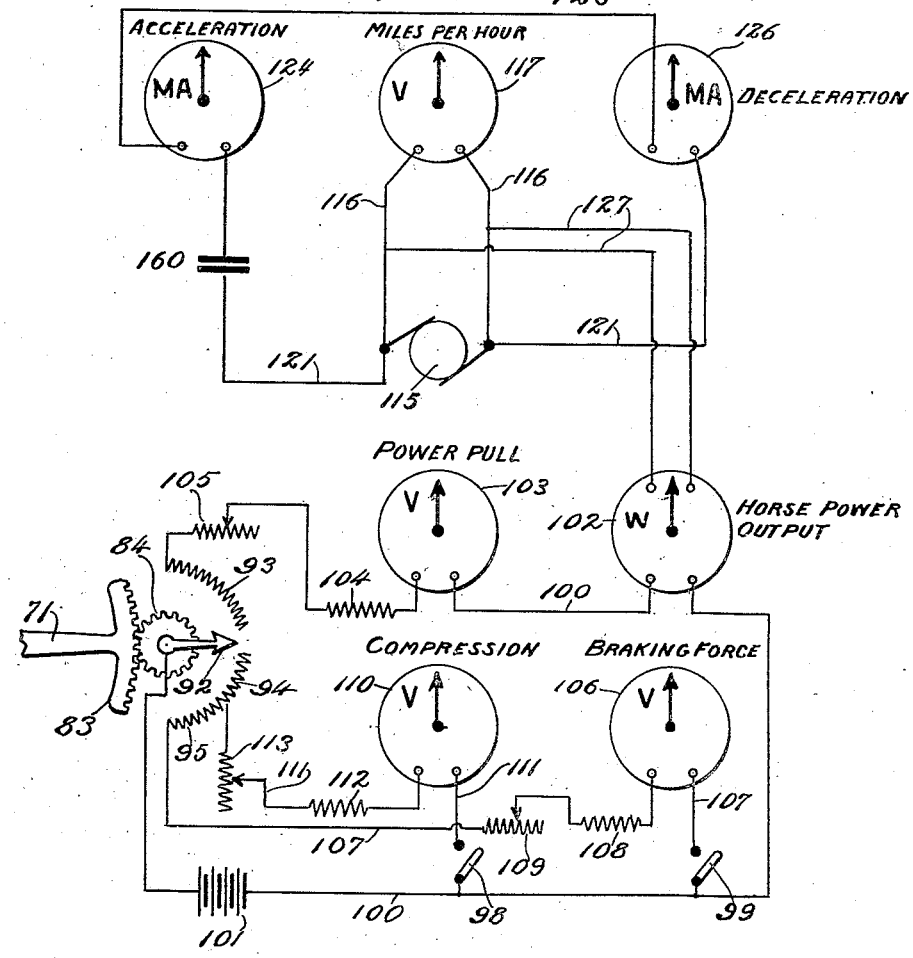

Patented Sept. 20, 1938

2,130,900

UNITED STATES PATENT OFFICE 2,130,900

DYNAMOMETER OR/AND TESTING APPARATUS FOR MOTOR VEHICLES

Otis F. Presbrey, Brooklyn, N. Y.

Application June 30, 1934, Serial No. 733,174

35 Claims. (Cl. 265—24)

This invention relates to dynamometers or/and testing apparatus for motor vehicles, intended to provide means for rapidly testing the functions of the operating mechanism of a motor vehicle, preferably through a wide range of tests, so as to be able to diagnose its functional troubles and difficulties and to arrive at a proper solution of the way to correct and adjust the functional parts of the vehicle, so that the most desirable operating and running conditions of the vehicle may be determined.

The means preferably provided are such that a motor vehicle may be operated just as quickly as though it were on the road and measurements may be made as quickly as the eye can read its instruments or as automatic recorders will graphically represent them.

Rapidity of operation and means of measuring is extremely important in large fleet maintenance work where an inspection of the driving means of a vehicle in the repair line must be made in such a short time that it will not cause a delay in the chain of maintenance operations.

Throughout the design of this testing apparatus, rapidity of operation has been kept in view, since the field of its usefulness is dependent largely upon that feature.

The methods and means heretofore in use for testing motor vehicles where the stations are not equipped with dynamometers are various and are practically nothing more than analyzers of pieces or parts, as they confine their readings or indications only to such parts, and they do not give even a fair range of analysis of the functional workings of the vehicle as a whole with all of its parts in place and working as a whole as they do on the road, not to mention that they do not give a reasonably complete analysis. A more or less extensive equipment is usually necessary either in the factory or scattered among a number of maintenance shops and in the aggregate is quite costly, and involves great delay in making tests, whereas under the present invention tests are made expeditiously which is of great value in maintenance shops.

It is an aim of the present invention not only to provide a factory with a testing unit such as to make it possible to completely diagnose the functional difficulties of a motor vehicle or car, but more particularly to place such a unit in the hands of a maintenance shop where the results of tests should be obtained by a simple and readily understandable method, and where it is the real desire to properly diagnose the condition of a vehicle and to evaluate the adjustments and repairs that the men of the shop have made on a vehicle.

It is one object of the present invention to provide an external source of power to drive the road wheels of a motor vehicle or motor car while the same is not traveling on a road or track, it resting in a given testing position. As another object it is preferred to provide an apparatus to test such mechanisms or appliances of the vehicle as the engine, clutch, transmission, brakes and the like just as though the motor vehicle is running on the road, although in a fixed or centered position while such parts are in action. Also to provide means for absorbing the power generated at the driving wheels of the car and for measuring the total force or tractive effort produced at the driving wheels.

To meet local conditions where it is desired to make the tests, an installation may be made by placing the testing apparatus as a unit in a pit below the floor level so that the motor vehicle or car to be tested may duplicate those conditions which the car encounters in traveling, and the car would then be at the floor level, access to this pit being obtained so that a mechanic can readily get in underneath the car, as and whenever desired. A minimum of floor space only is therefore required. Or, an elevated structure or stand may be provided with a run-way or ramp extending to it from the floor level so as to have the same facilities for testing at a higher level than that of the floor level, the stand being preferably a self-contained portable unit, containing the testing apparatus or dynamometer. In the case of the testing apparatus being located down approximately at the floor level the installation preferably is of a permanent nature. Other means for mounting and positioning the testing apparatus will readily occur, but in every case it is preferred to support the car partly on rollers or drums which may be caused to turn by the engine of the car, the external source of power, or both of them, while in some instances tests will be made while the car is resting idly, that is the car wheels are not revolving.

When the motor vehicle or motor car to be tested is in place in proper operative relation to the testing apparatus the operator within the car will be in full control of not only the car itself including its functional parts, but of all functional parts of the testing unit or equipment, preferably through a control panel or board having controls within his reach, and to that end the controls may be located at some available point within the car itself, preferably upon the steering wheel.

A visual indicating panel or equivalent provision for visually showing the indications or readings obtained during the tests is preferably arranged in a stationary position, removed but not too remote from the operator in the driver's seat, so as to be disposed in convenient full view of the operator, such panel or the like having a plurality of indicating, registering and recording instruments to portray to the operator the actual working performances of the car as a whole as it would perform under normal operating conditions upon the road.

The actual road conditions may be duplicated at will, such as climbing steep grades, running at high or low speeds on the level or coasting down hill, and the differential of the car may be brought into action by independently varying the rate of rotation of the road wheels with respect to each other. A rough road may be duplicated by providing means for changing the contour of the surfaces of the road wheels or the surfaces of the rollers or drums of the testing apparatus upon which the car is resting, so that the riding qualities of the car may be evaluated as well as the effects of a rough road upon the brakes and other parts of the car.

While the accompanying drawings illustrate electric power means and electrically controlled indicators, registers or recorders for obtaining the desired readings, it will become obvious therefrom and from this description that mechanical or other power means and mechanical or other indicating or reading means may be substituted, so that the testing unit or dynamometer is all mechanical or substantially so.

With objects in view such as stated, and with other objects in view as will appear, the invention consists of certain features of construction and combinations of parts to be hereinafter fully described and then claimed with reference to the accompanying drawings illustrating a preferred embodiment of the invention and in which Fig. 1 is a plan of an elevated structure or stand provided with the present improvements;

Fig. 2 is a side elevation of Fig. 1, parts being in broken lines, and illustrating diagrammatically a motor car or vehicle supported upon the stand in position for obtaining the desired tests;

Fig. 3 is a detail of a portion of the stand, partly broken away, to disclose certain elements including a roller or drum for supporting the vehicle;

Fig. 4 is a detail transverse section through the upper part of the stand illustrating such drum and concomitant parts;

Fig. 5 is a section taken through such a drum and showing a section of a clutch therefor for controlling its rotation;

Fig. 7 is a vertical section on the line 7—7, Fig. 6, parts being in elevation, looking in the direction of the arrows and showing certain parts not visible in Fig. 6;

Fig. 8 is a detail elevation of a variable speed gear box shown in Fig. 6 supporting suitable magnetic controlling means for shifting the gears in the box;

Fig. 9 is a broken elevation of portions of the stand as viewed between its opposite sides, to illustrate means for enabling a torque tube or housing to have a trunnioning movement within desirable limitations which are imposed by the linkage, etc. shown in such view which measure torque reaction;

Fig. 10 is a transverse sectional elevation of one side of the stand showing associated therewith the same means to measure torque reaction;

Fig. 11 is a section on line 11—11 of Fig. 10;

Fig. 12 is a detail section on the line 12—12 of Fig. 10;

Fig. 13 is a transverse section of a portion of the stand, parts being in elevation, to illustrate the indicating differential mechanism which may be manually controlled to show directly the difference in revolutions of the vehicle wheels;

Fig. 14 is a side elevation of the parts shown in Fig. 13, parts being in broken lines;

Fig. 15 is a horizontal sectional view of the differential mechanism shown in Fig. 13;

Fig. 16 is an elevation of the panel which is preferably mounted on the steering wheel of the motor vehicle and which is provided with suitable controls for the functioning parts of the apparatus;

Fig. 17 is a diagrammatic view of certain of the indicators for obtaining readings electrically, together with the electrical units which are in the circuits of such reading instruments;

Fig. 18 is a diagrammatic view to show the circuits and units involved in the control of the differential in the gear box of Fig. 6 and which in turn is controlled as by four buttons on the panel at the steering wheel;

Fig. 19 is a diagrammatic elevation of parts shown in Fig. 13 for controlling the differential there shown, to obtain equalization;

Fig. 20 is an elevation of an exhaust analyzer or indicator;

Fig. 21 is an elevation of a vacuum gage connected with the intake manifold of the vehicle to be tested to read manifold depression while testing; and Fig. 22 is a modified diagram of the circuits.

Figure 6:
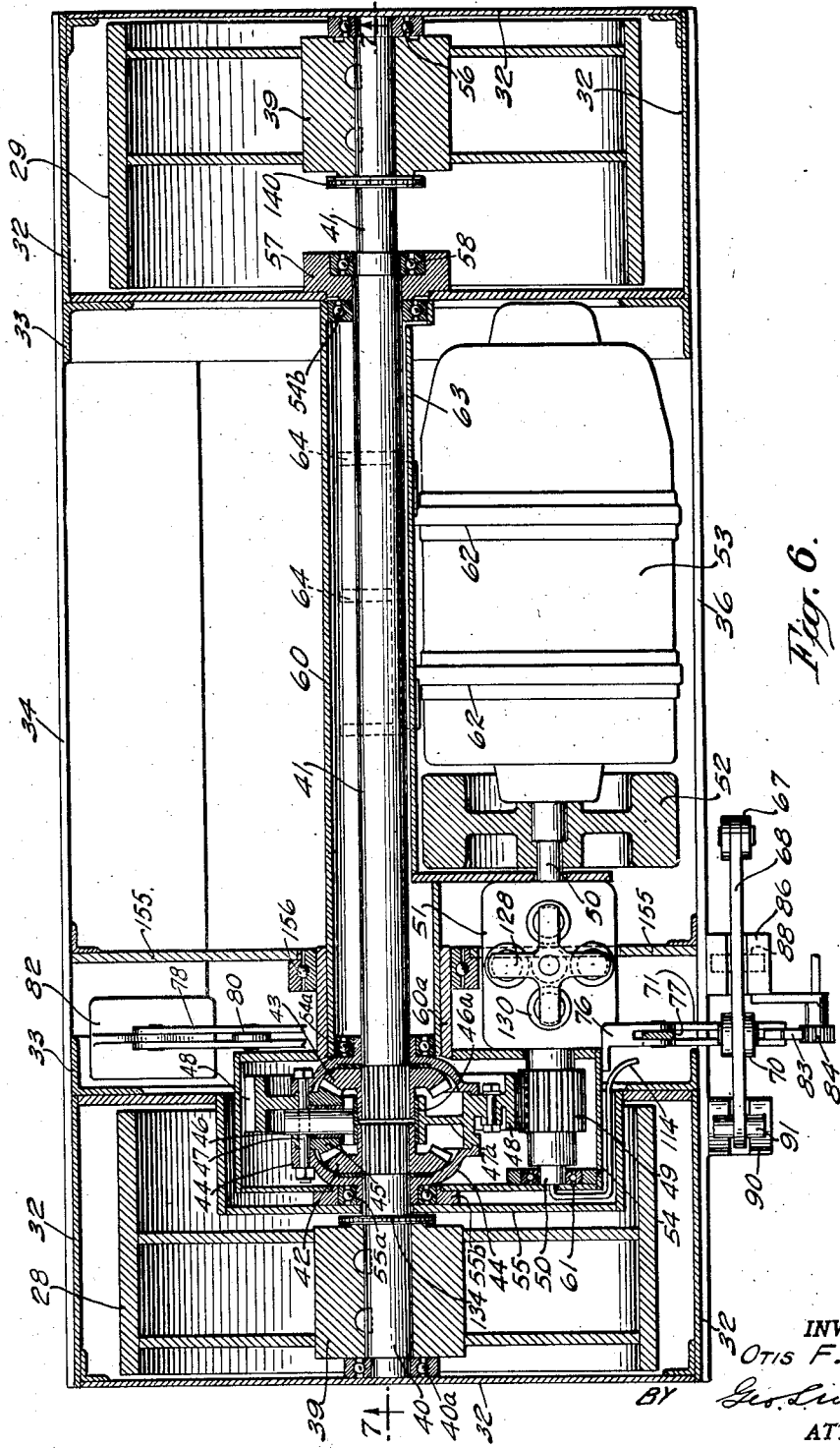
Fig. 6 is an enlarged horizontal section of larger drums on which the vehicle wheels rest and of certain parts associated therewith, which are shown partly in elevation as well as in section.

The improved dynamometer or testing apparatus may be mounted in any desirable and suitable position for obtaining the required tests, and Figs. 1 and 2 in particular show one way of mounting the testing apparatus for positioning the motor vehicle in an elevated position, which is a structure 25 which comprises parallel ramps or inclined run-ways 26 which lead up from the floor to elevated platforms or horizontal runways 27 which are also parallel with each other and are aligned with the ramps. When an elevated structure or stand is used, a space is thereby provided thereunder for use by a mechanic who can get in underneath the car or vehicle for his own desirable work, and so that jacks may be placed for elevating the car.

Referring to Fig. 1 four drums or rollers are illustrated, over upon and between which the wheels of a vehicle, such as the traction wheels, as shown in Fig. 2, may be positioned or cradled in such way as to hold the entire car or vehicle in situ while the desired tests are being made. Two of these drums 28, 29 are located in the respective runways 26, 27 of the stand, and preferably behind these the other two drums 30, 31 are positioned, the drums 30, 31 constituting idlers and being less in diameter than the drums 28, 29 and the axes of the idlers being located in a plane above the plane of the axes of drums 28, 29. Drums 28, 29 are adapted to be driven by positively driven wheels of the car or they may constitute means for driving the wheels, and hence they are active or power drums. The separate pairs of drums 28, 29 and 30, 31 are spaced apart somewhat so as to provide a centralizing gap or depression between them for cradling the vehicle.

The vehicle when run up the ramps and into the position indicated in Fig. 2 will have its traction wheels, for example, properly in position, to obtain which position the idler drums 30, 31 are locked as hereinafter described, so that they provide stationary surfaces leading from the ramps 26 to the larger drums. The larger drums 28, 29 being free to rotate counterclockwise against the traction of the vehicle wheels, these will not forwardly ride over the said drums, but will be kept in centralized position between said drums and the idler drums 30, 31.

The power drums 28, 29 are located within casings 32, one at each side of the stand, such casings being open at the top and the bottom, as shown in Fig. 7. Beams or supports 33 are provided which are permanently attached to the stationary drum casings 32 and these in turn are connected by a transverse beam 34, as more fully shown in Figs. 1 and 6. Beams 35 at the bottom of the stand also connect and stabilize the drum casings 32. Beams 36 and 37 are also provided to form stationary members of the supporting structure or stand, while the platforms or run-ways 27 are supported upon stationary posts 38.

Now referring to Figs. 6 and 7 it will be seen that the hubs 39 in the cylindrical drums 28, 29 are keyed respectively to the portions 40, 41 of a divided main shaft comprising two aligned separate shafts simulating the power shaft of the vehicle to be tested. Affixed upon the adjacent ends of the shaft portions 40, 41 there are bevel gears 42, 43, respectively, of a differential gear transmission, and a bevel gear 45 meshing with the gears 42, 43 is mounted upon a stub-shaft 46, whereby the gear 45 is carried within a differential casing 44, and of course the bevel-gears 42, 43 are also therein. A casting 47 is fixed between the two sections of the differential casing 44 and it directly and firmly supports the stub-shaft 46, and is formed outside of the casing 44 with a large gear 48, so that these parts constitute a well known form of differential gearing. The stub-shaft 46 rigidly supports a sleeve 46a in which turn the hubs of gears 42, 43, and therefore forms a supporting bearing for the adjacent ends of shaft portions 40, 41. The casting 47 has an internal web 47a which serves as an additional support for ring or sleeve 46a.

The means for maintaining normal angular relationship between the sections of the main shaft when no equalization torque is flowing is provided by the friction between differential gears 42 and 43 and common differential gear casing 44. This friction is sufficient to equalize the two sections of the divided main shaft when no torque is flowing. This equalization is further controlled by other means next to be explained.

The large gear 48 meshes with a pinion 49 which is rigidly mounted upon a counter-shaft 50 that extends parallel with the divided shaft 40, 41, such shaft 50 having mounted thereupon a variable speed gear box 51, the shaft 50 passing through such box and being divided for proper operation and assembly with any well known variable speed gear transmission which is located in the box 51, but as the same is so well known it is not necessary to illustrate it. Upon one portion of the divided shaft 50 there is rigidly mounted a heavy fly-wheel 52 and connected with such shaft portion and supported by tubular housing 60 there is an electrical power unit 53 which may function either as a motor or as a generator, or a squirrel cage type of motor, which may be controlled either electrically or mechanically from the driver's seat by one man in any suitable well known way. Preferably this is a 15 H. P. 1800 R. P. M. motor. The inertia of fly-wheel 52 exerted through gears 49 and 48 tends to establish a fixed speed for both gears 42 and 43 through their frictional contact with casing 44 and to equalize the speed of the divided main shaft when no torque is flowing. See Fig. 6.

A relatively rotatable dust protecting frame or housing 54 is provided for enclosing the differential transmission 42, 43, etc., including the differential casing 44 and the large gear 48 and pinion 49. This housing 54 is mounted to turn on ball bearings 54a between it and the shaft section 40. Thereby the housing 54 may when required turn relatively to the differential gearing just referred to. A casing 55 is mounted in a stationary position with respect to the stand 25, it being formed as a portion of the stationary casing 32 which encloses the drum 28. Shaft section 40 is supported at its inner end by the adjacent side of gear casing 44 which in turn is supported by a bearing 55a between it and a hub 55b on the stationary casing 55. Shaft section 40 for the drum 28 is mounted at its outer end on bearings 40a carried by the stationary drum casing 32, and the corresponding outer end of the shaft section 41 is carried by bearings 56 supported by the casing 32 for the drum 29. Shaft section 41 is furthermore supported by a hub-member 57 fixed to the casing 32 and carrying bearings 58 for the drum 29, an additional support for the shaft section 41 being furnished by the bearings 54a at the left hand end of the shaft section and which are supported by the adjacent side of gear casing 44.

A tubular housing 60 is arranged between the two larger drums 28, 29 so as to surround the longer divided shaft section 41, and it has a rotatory movement relative thereto. Tubular housing 60 turns on the ball-bearings 54a at the left end of the same, where it supports the casing 54 fixed thereto and upon bearings 54b at its right hand end which extends to the drum casing 32 at the right, such bearings being located between the tubular housing 60 and the shaft section 41. One section of the divided shaft 50 is mounted in bearings 61 carried by the rotatory casing 54, it extending through and also being supported by the opposite wall of said casing, while the other section of the divided shaft 50 is supported in any desirable manner from the casing of the electric unit 53, which casing is surrounded by straps 62, 62 which are connected with a housing 63 which partially surrounds the electric unit 53 and fly-wheel 52, such partial housing 63 being firmly fixed in a longitudinal cut-out of the tubular housing 60. To further support the straps 62 and the electric unit 53 and concomitant parts, the straps and the housing 63 are provided with securing elements 64 which are mounted rigidly upon the tubular housing 60.

From the preceding description it will be seen that it is possible for the pinion 49 to track or ride upon the large gear 48 of the differential casing 44 so that the shaft 50 of the pinion may be carried in a floating manner on the arc of a circle in one direction or the other with respect to the divided shaft 41 as the center of revolution, thereby carrying in the same way, relatively to the central shaft 41, the variable gear speed box 51, the fly-wheel 52 and the electric unit 53, which by such turning movements turn the tubular housing 60 which constitutes a torque tube. However, the extent of angular movement of the tube or housing 60 and the parts mentioned is preferably never through more than a few degrees around the central shaft 41.

The drums or rollers 28, 29 and 30, 31, when free to turn, being of sufficient size and weight to provide the car being tested with what may be termed a rotary road, will turn under the traction wheels resting thereon while the car is standing still, that is, in situ with respect to the entire testing apparatus. The differential speed obtained through the differential gearing 42, 43, etc. is translated to the short section of shaft 50 so as to impose the weight of the parts, connected with it and the torque tube 60, upon the torque tube, as the car unit driving the wheels to be tested for brake force, drag, etc. tends to climb the large ring gear 48 from the normal position of shaft 50 shown in Fig. 9. For the purpose of measuring the torque reaction required to drive the wheels to be tested, whose load is measured in pounds directly, a scale 65 is provided, Figs. 10 and 11, operated as now to be described.

The scale 65 has its pointer or indicator 65a operated by an arm 66 which is pivotally connected by a link 67 with a lever 68. (See in these connections Figs. 9, 10, 11 and 12 more particularly.) Lever 68 is fulcrumed intermediately of its length on a pivot 69 connecting it with a short link 70, which in turn is pivoted to a lever arm 71 mounted intermediately of its length by a pivot 72 upon a supporting bracket 73. This supporting bracket is mounted on stationary cross-pieces 74 connecting the lower beams 35, 35 of the structure of the stand. From one side of one of the run-ways or platforms 27 extends a reinforced flange 75 between which and the support 74 there is arranged the aforesaid lever arm 71 and the linkage now to be described.

A bracket arm 76 extends in a radially fixed position from the relatively rotatable casing 54 and is preferably in a horizontal plane normally. To it there is pivotally connected a link 77 which extends upwardly and is pivotally connected with the adjacent end of a lever arm 78 pivotally mounted intermediately of its ends upon a supporting bracket 79 affixed rigidly to the flange 75 so as to depend therefrom. The lever arm 78 extends over the divided shaft 40, 41 and the torque tube 60, it being positioned opposite to the adjacent face of the rotatable casing 54 so as to extend parallel therewith. By means of a link 80 the long arm of lever 78 is pivotally connected with the short arm of the lever 71 which is in substantially the vertical plane of lever 78 and extends underneath the shaft 41 and the torque tube 60. The long arm of the lever 78 extends beyond the link 80 in a short extension 81 which pivotally supports a balancing or counterweight 82, the purpose of which is to mechanically keep the lever arm 71 and the parts controlled thereby in central position.

The free end of the lever arm 71, where it extends beyond the lever 68 intersectingly, is provided with an arcuate rack 83, the curve of which is struck from the pivot 72 as a center. It needs but the very slightest initial movement of the bracket-arm 76 to cause a greater, corresponding, movement of the rack 83. The rack 83 is in mesh with a pinion 84, shown also in the diagram, Fig. 17, and the pinion is adapted to control a rheostat 85.

Returning now to Figs. 10, 11 and 12 the lever 68 is adapted to reverse the action of the lever arm 71, so that a single motion scale 65 may be used in the system, as the pointer 65a will then indicate torque in both directions. To that end the lever 68 has two fulcrum points which are provided on the one hand by means of a stationary bracket 86 on the adjacent beam 35 of the stand and which has slots 87 in which may play a pin 88 on lever 68, inasmuch as the bracket 86 is bifurcated so that the lever 68 may pass between the bifurcations. Here the lever 68 fulcrums on the pin 88 when that comes in contact with the closed upper ends of the slots 87.

On the other hand, to obtain a fulcruming in the opposite direction a bracket 89 is fixed to the adjacent beam 35 of the stand, and it is also bifurcated so that the lever 68 may extend between the bifurcations, which are provided in their upper ends with notches 90 of V-shape to receive a pin 91 at the free extremity of the lever 68. When the pin 91 presses into the bottom of the notches 90 by a movement of the lever 68, the pointer 65a of the scale will indicate torque in an opposite direction to that which is indicated when the lever 68 fulcrums on the pin 88, the movement of the pointer from zero corresponding with the movements of the arm 76 to one side or the other of its normal position. To obtain these fulcruming movements in opposite direction the link 70 on which lever 68 is mounted is located in between the supporting brackets 86 and 89. Inasmuch as the tubular housing or torque tube 60, which provides a mounting for the electric unit 53, fly-wheel 52, gear box 51, pinion 49, is itself, together with the respective housings for these parts, mounted on the roller bearings 54a, 54b, such parts are free to trunnion or swivel on those bearings within limitations imposed by the linkage system described with respect to Figs. 9 to 12 inclusive, as will be more fully described in connection with the operation of the entire apparatus.

Fig. 17 discloses diagrammatically the electrical connections and instruments which are involved with the movements of the arm 71 or the like, etc., and the rotation of the shaft 50, and it shows that the before mentioned pinion 84 carries the arm 92 of the rheostat 85. This rheostat has three sections 93, 94, 95 of resistance windings so that the motion due to torque action or reaction is transmitted electrically through the various circuit wires to the visual panel or board 96 (Fig. 2) and operates the four instruments 102, 103, 106, 110 in circuit with the rheostat and which are mounted upon the panel 96. The rheostat is suitably mounted on the stand. The wires from the rheostat are preferably enclosed in a cable leading to the instrument board or panel 96 which is located within the point of view of the operator sitting in the vehicle so that he may conveniently obtain the readings of the instrument mounted on the panel. Push buttons or switch means 98, 99 (Fig. 2) are mounted upon the control panel or board 97 supported by the steering wheel or other convenient part within the vehicle being tested, shown also in Fig. 16. These two manually controlled switches 98, 99 are directly connected with the wire of circuit 100 which leads from the axis or pivotal point of the arm 92 of the rheostat, a battery or source of electrical energy 101 being imposed in the circuit 100. The circuit 100 includes suitable electrical connections, well known, with meters 102 and 103, as shown in Fig. 17. The watt meter 102 constitutes the indicator for giving a reading of horse power output, the dial being suitably graduated to that end. The milliammeter 103 constitutes the indicator of power pull and its dial is suitably graduated to that end. Connected with and forming a part of the circuit 100 is a resistance 104 and a variable resistance 105, the circuit 100 being adapted to be closed through the rheostat winding 93 and the arm 92 which normally stands between the rheostat windings 93 and 94, that is when it is out of circuit.

An ammeter 106 is provided for giving a reading and indication of braking force. This ammeter 106 is in circuit with battery 101 through switch 99 when desired, through wire 107, resistance 108, variable resistance 109 and the balance of wire 107 which is connected with one end of winding 95 so that the instrument 106 may be included in a circuit including such winding.

Another ammeter 110 is provided for indicating and giving readings of compression, it being adapted to be included in a circuit which comprises the switch 98, wire 111, resistance 112, and variable resistance 113 which connects with the rheostat at a point between the resistance windings 94 and 95, and hence such circuit includes winding 94.

A flexible rotatable shaft 114 is at one end mechanically connected with and driven by the shaft 50, as shown in Fig. 6, this latter shaft supporting pinion 49, variable speed gear box 51, fly-wheel 52 and revolving ports of the electric unit 53 as before stated. The opposite end of the flexible rotating shaft 114 drives a generator or dynamo 115, Fig. 17, which may be located in the stand to deliver current through a transformer. Instead of a transformer, a condenser with a milliammeter in series with it and charged by the voltage of a generator which voltage rises and falls in proportion to the speed and thus charges or discharges the condenser, may be used to indicate acceleration or deceleration. Fig. 22 shows such a modification using meters 124, 126 with the condenser 160. By means of wire 116 the brushes of generator 115 are connected in a circuit with a volt meter 117 that constitutes a tachometer which is calibrated directly in miles per hour. Through wire 116 the primary 118 of a transformer 119 is connected across the brushes to the generator 115. The secondary 120 of the transformer forms a circuit through wire 121, variable resistance 122 and wire 123 with indicating ammeters 124 and 126 which are calibrated to read only negative or positive current as the case may be. Meters 124, 126 and voltmeter 117 are mounted upon the instrument board or panel 96, Fig. 2. The primary induces a difference of potential in the secondary whenever generator 115 changes its speed, and which will be indicated on meters 124, 126 in direct proportion to the rate of change of speed, so that the rate of acceleration or deceleration will be measured directly by such meters respectively. Ammeter 124 in circuit with the secondary of the transformer provides indicating means for reading acceleration, while ammeter 126, in circuit with the secondary of the same transformer, provides indicating means for reading deceleration. Wires 127 connect the tachometer 117 across to the watt meter 102 which is to indicate horse power output, so that the two may be read together.

Since meters 124 and 126 are not directly connected to dynamo 115 they do not respond to the constant current produced by the dynamo 115. A transformer 119 as shown in Fig. 17, or a condenser 160, as shown in Fig. 22, limits the flow of current in this circuit to only such current as is produced by a change of speed of dynamo 115. A change of potential in the dynamo circuit induces a voltage in the circuit of meters 124, 126. If the change of voltage is increased, current will flow through both meters 124, 126 and will be in one direction, and if the change of voltage due to change of speed is decreased, the current flow in such meter circuit will be in the opposite direction.

The two meters 124 and 126 are standard milliammeters for reading direct current and have polarity, and will respond with a scale reading to current flowing in one way only. The two meters 124 and 126 are hooked up reversely, that is, the negative of one is connected with the positive of the other, so that although the current flows through both meters simultaneously, only one will show a scale reading, while the other one being hooked up reversely tends to go off scale behind a zero reading, which effect may be and is limited by a mechanical stop pin within the meter holding the pointer from responding to this reverse current. A single meter with a central zero may be used in this circuit, which will indicate current in either direction and would be a direct measure of acceleration or deceleration as the current reverses, but it is preferred to use two meters, although the action is the same as though they were one.

The change gearing mounted within the variable speed gear box 51, Figs. 6 and 8, is controllable through an adjustable metallic spider frame 128, the arms of which are provided with contact elements or disks 129. These elements 129 are adapted to be attracted in pairs by the four solenoid magnets 130, shown in Fig. 8, and also in the diagram, Fig. 18. A combination of any two of the contact elements 129 with any opposed two of the solenoid magnets 130 may be obtained by means of the spider frame 128, as it is mounted on a socket joint which enables the mechanical shifting of frame 128 similarly to the mechanical shifting movement obtained through the medium of the ball and socket joint of the corresponding type of transmission control in a motor vehicle. Referring again to Fig. 18 the solenoids 130 may be electrically connected through wire 132 and switches 131 with a battery or source of current 133, for obtaining the selective control of the solenoids and the magnetically sensitive elements 129. Switches 131 or buttons are of course of corresponding number to the solenoids 130 and the contact elements 129 and are mounted as shown in Fig. 16 upon the control board or panel 97 which may be mounted on the steering wheel of the motor vehicle, as shown in Fig. 2. The wires from the switches or buttons 131 are preferably enclosed in a cable which runs to the solenoids 130. The parts to be here controlled obviously may be controlled by mechanical means entirely.

A chain drive 134 enables the shorter section of the divided shaft 40, 41, Fig. 7, to drive a shaft 135 which extends across from the drum 28 to the drum 29, at the opposite side of the supporting structure or stand. This shaft 135 also drives differential gearing 136 mounted in housing 137, located in drum 29, as shown in Figs. 13, 14 and 15 as well as in Fig. 7. This means provides a differential system for indicating equalization and is set in motion to show the difference in wheel revolutions directly. The shaft 135 is of course a divided shaft and the shorter section thereof is provided with a gear 138 which meshes with a gear 139 to drive a chain 140 which is operated by the main shaft section 41.

The differential gear 136 and its housing are mounted above a stationary support 141 for the generator 142 of an A. C. remote indicator and which is driven by chain 143 from shaft 135 and is electrically connected with motor 144 (Fig. 19) of this indicator located on the instrument board or panel 96. The wires from generator 142 to motor 144 may also be enclosed in a cable. This unit including generator 142 and motor 144 is preferably of the Selsyn type.

If drums 28, 29 do not rotate at the same relative speeds, the differential system, Figs. 13, 14, 15 and 19, for indicating equalization is set into motion to show the difference in wheel revolutions directly. It will be seen that one side of this indicating system is driven through the chain 134 in the same direction as the drum 28, while on the opposite side the motion is reversed through the medium of the gear 139 and chain 140. If, however, a difference of revolutions is set up between both sides of the system, the casing of differential 136 will revolve, in one direction or the other according to which side of the system is running faster, at a rate equal to one half of the difference in speeds between these two sides, that is between the two drums 28, 29. The speed and turning direction of differential 136, 137 is transmitted through generator 142 to the indicating motor 144 before mentioned, so that the operator while testing brakes, for instance, may know to a certainty which side of the system has the heaviest braking force and approximately how much heavier it is than at the opposite side of the car actually being tested.

An additional support or mounting for the main shaft-section 41 may be provided as shown in Figs. 6 and 7, to which end a beam 155 may be rigidly secured to the frame members or beams 34, 36. Beam 155 would then firmly support a bearing 156 for receiving the hub-extension 60a of housing 54 into which the adjacent end of torque tube 60 is rigidly fixed. In some such way there would be provided rigid means for supporting the corresponding end of the torque tube and the corresponding end of shaft section 41. By providing means for properly supporting each end of each section of divided shaft 40, 41, bending stresses of such shaft and the differential casing are avoided.

While the power of the car is being measured with its motor running, the drums 28, 29 carry the dragging force from the traction wheels of the car (Fig. 2) which causes differential casing 44 and ring gear 48 to revolve at the average speed of such traction wheels, inasmuch as pinion 49 is loaded to the gravitational force of fly-wheel 52 and electric unit 53, which tends to retard the motion of the gear 48 to the extent that the scale or indicating instrument 65 measures this retarding force, which is a combination of the inertia of fly-wheel 52 and the drag of the electric unit 53 (the motor-generator) as well as any friction of the variable speed-gear box 51, pinion 49, or the bearings or grease. This true mechanical torque is the force exerted by the traction wheels in driving the drums 28, 29 while testing, or on the road while running, which force causes the car to move. This is the same system that measures brake force in the opposite direction.

The motion of the lever 71 is as before described transmitted through a rack and pinion connection to the contact arm 92 of the rheostat, and on account of the three sections of windings 93, 94, 95 of the rheostat, motion, due to torque action or reaction, is transmitted electrically to the visual instrument board or panel 96 to operate the four measuring instruments 102, 103, 106, 110.

The stand operator always has the mechanical scale 65 to check and adjust the power, compression, and brake indicating instruments through the variable rheostat 85. The average speed of the system is measured by the flexible shaft 114 which being operated by the shaft 50 drives the generator 115, which in turn is connected with the tachometer 117 calibrated directly in miles per hour.

The introduction of gear box 51 provides through the medium of motor 53 several speeds at which the operative parts of the testing apparatus will absorb or produce its capacity H. P. without varying its speed appreciably. This means that a car may be tested at a fixed speed from no load to full load, or through the entire range of carburetion or ignition adjustments to provide accurate settings and adjustments by the mechanism before changing the gears in the gear box 51, which in turn will change the speed at which the apparatus operates while maintaining nearly synchronous speed of a motor of the squirrel cage type or may be varied in speed between these fixed speeds by the use of a variable speed motor, whose external resistance is controlled by the rotary dial on panel 97. This method of control makes it possible to obtain any speed between the maximum and minimum speeds. The speed of the gear set in box 51 may be varied between synchronous points when so desired so that the speed range when testing may be made most flexible.

Referring to the linkage system shown in Figures 9, 10, 11 and 12, this acts to reverse the motion of the lever arm 71 so that a single motion scale 65 may be used in this system. To that end lever 71 has the two fulcruming points at 88 and 91. The motion of the rack and pinion 83, 84 is up or down depending on whether input or output is being measured. Power input leaves the fulcrum 88 of lever arm 71 against the fulcruming point at the top of the bracket 86, which pulls the scale end of lever 68 down to measure a torque value on scale 65. Power output on the linkage system causes the rack and the pinion 84 to pull down, releasing fulcrum 88, but engaging fulcrum 91 with the bracket 89, causing the scale end of the lever 68 to pull down.

The entire dynamometer unit is self-contained, being mounted in its own frame which properly shields and guides the car wheels to be tested. The preferred exact location of the pairs of drums 28, 29 and 30, 31 and the angle of such pairs of drums relatively to each other have been carefully worked out to provide a definite location for the wheels of the vehicle so as to avoid danger of throwing the vehicle out of the stand on either power application or brake application, the car then requiring no positive locking means for holding it on the stand.

An independent exhaust anaylzer shown in Fig. 20 is mounted on the instrument board 96, the elements of which may be connected to a flexible exhaust pipe of the stand so as to be slipped over the pipe of the automobile which is being tested, or the exhaust manifold of the car may be tapped directly for applying such analyzers. A vacuum gage, Fig. 21, is also connected with the intake manifold of the car to be tested to read manifold depression while testing, and is mounted on the instrument board or panel 96.

The drums 30, 31 may be provided with end play, provided by slight clearances at their ends (see Fig. 5), so that the toe-in of the vehicle wheels being tested may be analyzed under load conditions. These idler drums 30, 31 will track with the wheels of the car and not change.

Space is provided between the drums 30, 31 to mount jacks for lifting the car for repairs which are to be made, or if wheels thereof are to be removed for inspection. Chocks 27a may be provided along run-ways 27 to further safeguard the car while being tested.

The described testing apparatus provides a rapid means for a mechanic to observe the effects of his adjustments of ignition, carburetion, timing, brakes or any other device or parts of the car which affect its performance. The exact stopping distance can be determined by knowing the weight of the car and the brake force shown in the torque system as well as the rate of deceleration. The fact that the car may be controlled completely from the driver's seat, by one operator who has the control panel 97 at hand is of great value as it means that only one operator is required. The fact that the instrument panel or board 96 is in clear view of the tester and any one else sitting in the car, still further facilitates the rapidity of the tests and the effects of the adjustments being made by the mechanic outside of the car. Means are also provided as shown to the right of Fig. 16 so that the operator-tester may write down the record of his tests while the tests are going on.

The gage of the drums 28, 29, 30, 31 may be changed to accommodate passenger cars, trucks, busses and trolley cars of any capacity.

The dynamometer or testing apparatus in short provides means of loading a car under its natural road conditions, as well as for applying power to drive independent members for calibration work on brakes, variable speed, transmission, Diesel engine pumps and other operating parts of the car or vehicle to be tested.

Referring to Fig. 1, gage or guide lines are shown as extending upon and around the cylindrical surfaces of the drums 28, 29 and 30, 31 as well as along the ramps 26 and the platforms 27 of the stand. These marked lines are parallel with each other and serve to gage the tracking of the car at front and rear, as under road conditions, to show distortion between the axles of the wheels due to any misalignment of the wheels.

A rotatable control member or disk 145, shown in Figs. 2 and 16, is preferably located on the control board or panel 97 and which by means of the circuit wires contained in a flexible cable 146 connects with the resistance and regulating means (not necessary to be shown) of the motor 53, so that the operator within the car has at hand means for starting and stopping the motor and for controlling its speed. Suitable indicating means are associated with the board 97 and the rotatable member or disk 145 for indicating the starting and stopping point of the motor and also its speeds. Cable 146a is shown in Fig. 2 for combining the wires which lead from the other buttons or controls mounted on the control panel 97 and which are the wires shown in the diagram, Fig. 17.

Referring to Figs. 1 to 5 inclusive, mechanical braking means are shown which operate on the idlers 30, 31. To this end brakes 147 mounted within the idler drums 30, 31 may be operated either independently or collectively. A control handle 148 is mounted on the shaft of the idler 31 and a link 149 is connected with said handle. This link is provided with a slot 150 which receives a pin 150a on handle 148. For the brake of the other idler drum 30 a handle 151 is adapted to operate the same and a slotted link 152 similar to link 149 also connects with the handle 151 by a pin similar to pin 150a. The two links 149, 152 arranged at opposite sides of the stand of the testing apparatus are pivotally connected with arms 152a depending from a pivot shaft 153 which is mounted in suitable bearings of the stand, such shaft extending below the car or vehicle which is being tested. On one end of the shaft 153 there is fixed an upwardly extending adjustable control lever 154. The control lever 154 provides means for acting on the handles 148, 151 for collectively operating the brakes 147 so as to lock the idler drums 30, 31 to allow the car to be driven to or from the testing position. When the control lever 154 is released, it is possible to individually operate the brake handles 148, 151. Thereby it is possible to individually apply friction or drag on either the right or left hand idler drum with a view to providing a one sided drag which the operator can apply to equal the drag on the opposite side of the car, so that the system of the testing apparatus becomes balanced and the drum differential indicating mechanism is made to stand still to check the amount of difference of drag between the two sides of the car.

When the rear wheels of the car to be tested are resting on the drums or rollers 28, 29 and 30, 31, and the motor of the car is running, any motion of these wheels is transmitted independently to each set of drums on the right and left sides of the car. Then, these drums will turn in the direction that the road would pass under the wheels by turning counter-clockwise as shown in Fig. 2, with the car wheels turning clockwise. As the gear box 51 containing its speed change gears, and the pinion 49, are trunnioned on the stationary frame or stand, any forces which are exerted in either direction are measured directly on scale or dial 65. For instance, as power is applied, the pointer 65a would start from zero and move out in direct proportion to the amount of torque exerted on the assembly including torque tube 60 which is movable relatively to main shaft 40, 41. If low speeds are required, the transmission in box 51 is placed at a high ratio between the motor 53 and the drums and if high speeds are desired this ratio is reduced to a direct drive. Electric unit or motor 53 itself can be provided with a variable resistance controlled from the panel 16 by dial 145. This acts as a means to set speeds of the complete apparatus between the positive gear ratios of which a number are provided. When the driving force of the car motor is discontinued, torque member 54, 71, returns to the neutral position showing that no power is going in or coming out.

When the power is applied to electric unit 53 and the wheels are turned by power from the external sources and the brakes of the car are applied, the amount of braking force exerted is shown on dial 65, Fig. 10, and dial 106, Fig. 17, caused by the pinion on shaft 50 climbing on ring gear 48 which causes the entire torque assembly to move and again operate rack 83 and pinion 84, but this time in a reverse direction, which energizes the rheostat circuit in Fig. 17, indicating the braking torque on instruments 106 and 65. If, during this brake application, the force is not the same on both drums 28 and 29, there will be set up a difference in revolution between these drums. This difference in motion turning remote control generator 142 moves its motor 144 which either indicates or records direct difference in motion between the two wheels of the car. In order to determine the amount of this unequal braking force, hand brakes 147 are applied to idler rollers or drums 30 and 31, these brakes being independently energized by hand levers 151 and 148 so that the difference of revolutions may be corrected and the equalizing system brought to rest. The amount of force necessary to bring this system to rest can be compensated for in the braking system of the car by the mechanic who knows which wheel has the lesser stopping force and how much less it is than the other side.

In order to roll the car off the stand these two brakes are simultaneously applied by hand lever 154 so that the car may climb the locked drums 30 and 31 and back out of the well between the two sets of drums. The front wheels of the car are placed into the well as described and tested in a similar manner.

If the traction wheels of the car are turned over slowly with the engine connected through the clutch and transmission, but the ignition is not turned on, and each cylinder is pulled over compression by means of the dynamometer motor, the torque system is deflected an equal amount proportional to the compressional resistance and is shown on instrument 110, Fig. 17, which will register each cylinder's compression separately so that if faulty valves, rings or other parts affecting compression are not equal their difference is shown directly on instrument 110.

While testing for power, adjustments in the ignition, carburetor and timing and other parts of the car can be made while running under load, by observing the effects of adjustments on the power pull instrument 103, Fig. 17.

The preferred functions and features of the invention may be set forth in the following summary.

It combines both the means of regulating and absorbing the power of a motor vehicle and a means of observing the action of brakes, even under the most severe conditions, and at all speeds.

The power drums or car wheel contacting members are so connected together mechanically as to be relatively angularly rotatable with respect to each other, thus differing from present dynamometers wherein the drums and their shaft are rigidly connected.

The introduction of speed changing gears between the testing motor 53 and the drum shaft gear 48 which is necessary in order to use a small fly-wheel to provide inertia equal to that of the car in the road enables stopping distances on the road to be closely predicted. These speed changing gears enable extremely slow speeds of the vehicle motor to be obtained when driving it from the test stand motor through these gears, as, for example, when it is desired to observe the torque reactions of the dynamometer due to the compressions of the individual cylinders and so to detect leaky cylinders.

"Cradling" the housing 54 of the shaft 50 of the apparatus so that it may float as it were is also new in its application to dynamometers. This housing is mounted on bearings and has attached to it a torque arm for the torque and, in combination with the speed, the horse-power received by or delivered to the road or power drums. The motor 53 may be either rigidly connected to this housing or may drive the differential mechanism through a jointed shaft.

Idler drums 30, 31 have small longitudinal motion on their shafts for the purpose of properly adjusting the steering wheels by observing the endwise motion of these drums if the wheels are not set at the proper angle.

Proper location of the idler drums relative to the road or power drums in such a way that the vehicle need not be locked down for either power or brake application. This involves a proper relation of road drum and idler centers.

The guide lines shown in Fig. 1 extending longitudinally along the runway and around the circumference of the drums are of value in detecting misalignment of the front or rear axles, this misalignment causing the wheels to track improperly, which in turn may explain rapid wear of tires, slewing of the car when brakes are applied and other operating faults. The observer notes the relation of the axle with respect to such guide lines, and if the lines do not cross the axle at right angles, the observer knows that the axle is not properly aligned.

Elimination of bending stresses in the divided axle and housing: The ordinary method of arranging the bearing supports in the rear axle of an automobile and especially in and near the differential does not permit a heavy load, such as the dynamometer motor, to be imposed upon it. The arrangement shown in the drawings provides separate bearing supports at the two ends of the power drums and also at the two ends of the differential casing, thus insuring strength to resist vibration of the heavy cradled masses and sudden torque applications.

The idler drums: In the ordinary power dynamometer in use at present, the idler drums may be either free running when testing or completely locked when backing the car out of the well. In the present invention, these idlers are best supplied with brakes 147 similar to those in use on automobiles, so that the resistance to turning may be delicately graduated separately on the two drums for the purpose of measuring the difference in torque on the two sides of the car. In addition their centers should be arranged, not only so that the car will not climb out of the well during power measurements as in present dynamometers, but will not cause undue wedging of the car wheel tires when the car wheel brakes are applied and when the main pressure is exerted against the idlers.

A differential meter necessary in equalizing brakes: Since unequal drags of the car brakes act to produce unequal speeds of the dynamometer drums, it was desirable to devise a special means of indicating this difference in speed. The mechanism 135, 136, etc. is composed of the same parts as those used in the differential of an automobile, but they are differently operated. The two halves of the divided shaft 135 are turned in opposite directions instead of the same direction, the miter gear supporting pins revolving at one-half the difference in speed of the two halves of such divided shaft, the differential casing 137 on which the pins are mounted being used to convey this difference in speed to the instrument board by any suitable means. Unequal drags of the car brakes are thus instantly shown.

Special meters devised to interpret the forces and motions developed in this test stand:

1. *The differential speed or equalization meter.*—This meter has been described above.

2. *Horse-power meter.*—It indicates directly the horse-power exerted on the dynamometer drums and a special meter similar to a wattmeter was devised in which the current in the current winding is caused to be proportional to the torque exerted by the torque arm and the potential winding current is proportional to the speed. The current in the current winding may receive its proper variation from the movement of the slide of a slide wire rheostat or from the pressure of the torque arm or a carbon pile. The potential winding may receive its variation in current from the voltage of a generator 115 driven at the mean speed of the power drums and which voltage is proportional to the speed.

3. *Acceleration meter.*—This consists of a milliammeter actuated either from E. M. F. of the secondary of a transformer, the primary of which receives its voltage from a direct current generator 115 whose voltage varies in proportion to the speed or from the charging current passing through it into a condenser from the D. C. generator. In either case only an increase in speed will cause current to flow through the milliammeter.

4. *Deceleration meter.*—The acceleration meter might also be used for this purpose in which case the scale zero would be in the center of the scale. However, it may be desirable to provide another meter indicating only with an opposite current flowing during deceleration.

5. *Torque or tractive effort meter.*—This is merely a suitable ammeter 103 connected in series with the current coil of the horse-power meter and therefore reading in proportion to torque. A scale of tractive effort at the car wheel tires may also be placed on it.

Some other meters which are at present in use but which are essential to complete the purposes for which the test stand was designed are:

1. *Vacuum gauge.*—This is used to measure the intake manifold depression from the abnormal readings of which leaky gaskets, valve stems, pistons and throttle stems may be detected. It may also be used on the fuel feed supply line to indicate restrictions or leaks.

2. *Tachometer.*—This meter 117 may be calibrated in miles per hour and may be used to check the car speedometer.

3. *Exhaust gas analyzer.*—This is of use in adjusting carbureters to the most desirable air-fuel ratio.

In order to explain more clearly the action of the various parts and their combinations such as shown and described, a description of the manner of conducting a car test may be of value.

The front wheels of the car are driven over the idler drums 30, 31, Fig. 1, and dropped into the well, Fig. 2, between the idler drums and the power drums 28, 29. It is unnecessary to lock the idler drums as the front wheels may be gently lowered into the well by the drag of the rear wheels on the approach runway 26, Fig. 2. The driver may unhook the control board 97, Fig. 16, from the support on which it may be hung at one side of the test stand, draw it into the car through the window, hook it on the steering wheel by the hooks and press the control button 145, Fig. 16, starting the test stand motor 53, Fig. 1, and thereby causing the front wheels to revolve, the speed change gears in the gear box 51, Figs. 6 and 8, having previously been set to the desired ratio by pressing the proper buttons 131, Fig. 16, on the control board 97 to operate the electro-magnetic speed-change gear shift 128, Figs. 1 and 8. The car brakes are then applied (with a measured pressure if desired), the reading of the brake torque meter 106, Fig. 17, is noted and the equalization meter 144, Fig. 19, is observed. The operator may then leave his seat in the car, make trial adjustments of the brake bands, return to the car seat, apply the car brakes and note the meters 106, 144, as before, continuing this process until the braking force in the two sides is equal and the total braking torque is satisfactory. Dragging brakes may be observed by noting the equalization meter 144 and brake torque meter 106, since if one side drags while the other is free the equalization meter will indicate, while if both brakes drag the brake torque meter will indicate the amount of the drag. The brakes of the idlers 147, Fig. 3 and Fig. 5, are useful in such a case to balance the drag of one side and observe the torque meter, one-half the reading being due to the car brake drag.

Faulty steering wheel adjustment is observed by noting failure of the front wheels to remain in the same guide lines, such as shown in Fig. 1, as the rear wheels when the steering wheel is free. Too must "toe-in" forces the idlers outward just as the tire attempts to force the road out sidewise and failing to do so, slides, causing wear.

The accuracy of rim adjustment and the true turning of the wheels may be observed and properly corrected if not right. This is done by the observer looking down on each wheel to see if it is or is not true with respect to the parallel lines shown on the ramps 26, run-ways 27 and the rotating members or drums 28, 29, 30, 31, Fig. 1.

The front wheels are then forced out of the well between the power drums 28, 29 and the idler drums 30, 31, or, may be assisted by turning the power drums by motor 53, Fig. 1, and the rear wheels are advanced into the well. The brakes may here be equalized and adjusted in the manner previously described for the front wheels. The tracking of the rear wheels with the front wheels may be noted by observing their position on the guide lines, Fig. 1. Failure to track properly indicates that the front and rear axles are not parallel.

The rear or drive wheel horse-power may then be determined with the car as received in the shop. Having knowledge of the horse-power which this type of car should deliver at various speeds, the mechanic proceeds to determine the cause of any reduction in horse-power. The measurement of the rear wheel horse-power is made as follows: The mechanic starts the car just as it is normally driven after shifting the speed change gears in box 51 to such a position that the test stand motor runs at synchronous speed when the car runs at the desired speed. For example, using a squirrel-cage induction motor of 1800 R. P. M. synchronous speed on the test stand, the speed change gears might be set to give a car speed of 10 miles per hour. This setting may be accomplished by a gear shift lever if operated mechanically or by the buttons 131, Fig. 16, on the control board on the steering wheel. Watching the speed indicator 117, Fig. 17, on the instrument board, the operator may press the button on the control board which connects the test stand motor to the line when the speed indicator 117, Fig. 17, shows about 10 miles per hour. This is not essential but it avoids excessive line currents. The throttle of the car may then be opened, the test stand motor becoming an induction generator and feeding power back into the electric supply lines.

The car wheels now drive the power drums 28, 29, Fig. 1, then to the differential ring gear 48, Fig. 6, to the pinion 49 on the speed change gear box 51, and through the gears therein to the induction generator 53. The force exerted by the ring gear 48 against the pinion teeth tends to carry around with it the whole cradled mass constituting the torque member which force or movement is resisted by calibrated springs or a spring in a spring balance 65, Fig. 10, the deformation of which is transmitted to the torque meter 106, Fig. 17, the compression meter 110 and the horse-power meter 102 on the instrument board 96, Figs. 1 and 2. These measurements may be repeated at the other speeds at which the speed change gearing may be set, and so the car may be operated by the driver from idling to wide-open throttle, just as though it were on the road, the speed changing only slightly with this squirrel-cage-type of generator.

If it is desirable to obtain all speeds from minimum to maximum and at any throttle opening, a variable speed induction motor should be used, the rotor rheostat arm being extended so that the operator may manipulate it from the driver's seat. If a direct current motor is used, power may be pumped back into the line and all speeds and throttle openings of the car may be obtained by the well known method of field and armature control. If it is desired to operate the engine of the car at a higher speed than can be obtained by the test stand speed-change gears, the car may be operated in its own second gear, the loss in the gears usually being negligible for this type of work.

If the horse-power is less than its proper value, the ignition timing may be checked while the throttle is wide open and the motor at maximum speed by manipulating the spark control, observing if the horse-power increases as the spark is advanced until near the end of the range of motion where it should show a slight decrease.

In adjusting a carbureter for acceleration, the resistance to acceleration may conveniently be supplied by the fly-wheel 52, Fig. 6, on the test stand motor shaft 50, and may have sufficient inertia to cause acceleration rates about equal to those of medium weight cars on the road. For example, the car may be slowed down to 10 miles per hour, the throttle opened wide and the acceleration rate observed in the acceleration meter 124, Fig. 17, on the instrument board. The carbureter having adjustable accelerating means may be set to give maximum values by watching this meter while adjusting its fuel control means.

The deceleration meter 126, Fig. 17, is useful in measuring retarding forces on the car, such as dragging brakes, friction in the motor, friction in the transmitting mechanism and resistance caused by improperly inflated tires.

The foregoing description of the manner of conducting a car test is intended to illustrate some of the uses to which the devices classed as improvements in this invention may be applied and their usefulness in detecting faults in a car. Other measurements may be made just as they are at present made on power dynamometers now in existence.

In the construction shown in the drawings, inasmuch as the distance between the drums is limited by the car wheel tread, the length of the motor is limited, which necessitates a small motor. The capacity of the motor may be increased by means of an air blast over it so that a 15 H. P. motor will successfully absorb 75 H. P. from the car wheels for a sufficient period of time to make the necessary observations of car performance.

It will be obvious to those skilled in the art to which this invention relates that it is susceptible of considerable modification, without departing from the scope of the appended claims.

What I claim as new and of my invention is—

1. A testing apparatus, including in combination, means with which the wheels of a motor car may contact while the weight of the car is imposed thereon, such means being provided for each side of the car and each freely, relatively angularly movable with respect to or in unison with the other such means, power means operable at will and extraneous to the car, and in common with and floatably connected with the angularly movable means which are at opposite sides of the car, adapted to positively drive such means, or to react thereon when the motor of the car is delivering power to the car wheels, and torque measuring means controlled from the angularly movable means and such floatable power means.

2. A testing apparatus, including in combination, a runway for the wheels of opposite sides of a motor car, duplicate rotatable means arranged at opposite sides of the runway and protruding at the runway for engagement by the car wheels, differential means connecting such duplicate rotatable means, a single floatable, power and torque means extraneous to the car and in common with the duplicate rotatable means, adapted to positively drive such rotatable means so as to measure torque in both directions, or to react on the rotatable means when the motor of the car is delivering power to the car wheels, means for taking off the result of tests from the rotatable means and such power means, and means acting to position the car in testing position on such rotatable means and to free it so that it may be removed.

3. A testing apparatus, including in combination, movable means with which the wheels of a motor car may contact while the weight of the car is imposed thereon, such means being provided for each side of the car and each relatively movable with respect to or in unison with the other such means, a divided main shaft carrying the movable means mounted to operate, or be operated in common by, such movable means, a differential connecting the two sections of the shaft and the casing of which is provided with a ring gear, and power means including a pinion acting on the gear to positively drive such shaft, or to react thereon when the motor of the car is delivering power to the car wheels, such pinion having a traveling movement on the gear with an increased or decreased effort in contradistinction to its ordinary rotary movement when the apparatus is running normally.

4. A testing apparatus, including in combination, movable means with which the wheels of a motor car may contact while the weight of the car is imposed thereon, such means being provided for each side of the car and each relatively movable with respect to or in unison with the other such means, a divided main shaft mounted to operate, or be operated in common by, such movable means, a differential connecting the two sections of the shaft and the casing of which is provided with a ring gear, a counter-shaft floatably mounted alongside of the main shaft for torque measuring, a pinion on the counter-shaft and operably connected with the main shaft, and power means for turning the counter-shaft whereby the pinion and gear will drive the main shaft, or react thereon when the motor of the car is delivering power to the car wheels.

5. A testing apparatus, including in combination, a support, means mounted thereon with which the wheels of a motor car may contact while the weight of the car is imposed thereon, such means being provided for each side of the car and each relatively movable with respect to or in unison with the other such means, power transmitting means mounted on the support and connected with and adapted to operate such movable means or to be operated therefrom, to obtain such relative and unison movements of the movable means engaged with the car wheels, and floatable power means independent of the car, such power means having a range of bodily travel about the axis of such movable means and acting to positively drive the power transmitting means or to react thereon when the motor of the car is delivering power to the car wheels.

6. A testing apparatus, including in combination, a support, means mounted thereon with which the wheels of a motor car may contact while the weight of the car is imposed thereon, such means being provided for each side of the car and each relatively movable with respect to or in unison with the other such means, power transmitting means mounted on the support and connected with and adapted to operate such movable means or to be operated therefrom, to obtain such relative and unison movements of the movable means engaged with the car wheels, and power means independent of the car, the power means floatably mounted to be bodily movable as a whole with respect to the power transmitting means to absorb power, and the power means acting to positively drive the power transmitting means or to react thereon when the motor of the car is delivering power to the car wheels, and force measuring means affected by the floating movement of the power means.

7. A testing apparatus, including in combination, a support, means mounted thereon with which the wheels of a motor car may contact while the weight of the car is imposed thereon, such means being provided for each side of the car and each relatively movable with respect to or in unison with the other such means, a divided main shaft mounted on the support and having its respective sections separately directly connected with such dual movable means, a differential connecting the two sections, and the casing of which is provided with a ring gear, a counter-shaft having a pinion meshing with the gear, means for floatably mounting the counter-shaft with respect to the main shaft, and power means acting on the counter-shaft to oppose power delivered from the motor of the car to such movable means, and force measuring means affected by the floating movement of the counter-shaft.

8. A testing apparatus, including in combination, a support, means mounted thereon with which the wheels of a motor car may contact while the weight of the car is imposed thereon, such means being provided for each side of the car and each relatively movable with respect to or in unison with the other such means, a divided main shaft mounted on the support and having its respective sections separately connected with such dual movable means, a differential connecting the two sections and the casing of which is provided with a ring gear, a divided counter-shaft having one of its sections provided with a pinion meshing with the gear, means for floatably mounting the counter-shaft with respect to the main shaft, and power means acting on the other section of the counter-shaft to oppose power delivered from the motor of the car to such movable means, a conventional gear box connecting the sections of the counter-shaft, and a fly-wheel fixed on such other section of the counter-shaft to increase the inertia of the rotating elements, the power means and fly wheel being operably associated with the counter-shaft for absorbing or delivering torque thereto, the value of the torque being measurable by the angular relation of the counter-shaft to the main shaft.

9. A testing apparatus, including in combination, a support, means mounted thereon with which the wheels of a motor car may contact while the weight of the car is imposed thereon, such means being provided for each side of the car and each relatively movable with respect to or in unison with the other such means, a divided main shaft mounted on the support and having its respective sections separately connected with such dual movable means, a differential connecting the two sections and the casing of which is provided with a ring gear, a divided counter-shaft having one of its sections provided with a pinion meshing with the gear, means for floatably mounting the counter-shaft with respect to the main shaft, a variable speed change gear connecting the two sections of the counter-shaft, and power means acting on the other section of the counter-shaft to oppose power delivered from the motor of the car to such movable means, and a fly-wheel fixed on such other section of the counter-shaft to increase the inertia of the rotating elements, the power means and fly wheel operably associated with the counter-shaft for absorbing or delivering torque thereto, the value of the torque being measurable by the angular relation of the counter-shaft to the main shaft, and means for maintaining a normal angular relationship when no torque flows.

10. A testing apparatus, including in combination, a support, means mounted thereon with which the wheels of a motor car may contact while the weight of the car is imposed thereon, such means being provided for each side of the car and each relatively movable with respect to or in unison with the other such means, a divided main shaft mounted on the support and having its respective sections separately directly connected with such dual movable means, a differential connecting the two sections and the casing of which is provided with a ring gear, a divided counter-shaft having one of its sections provided with a pinion meshing with the gear, means for floatably mounting the counter-shaft with respect to the main shaft, and power means acting on the other section of the counter-shaft to oppose power delivered from the motor of the car to such movable means, a conventional gear box connecting the sections of the counter-shaft, such power means including a power unit constituting a motor mounted on such other section of the counter-shaft to float with the counter-shaft, and force measuring means affected by the floating movement of the counter-shaft and power unit.

11. A testing apparatus, including in combination, a support, means mounted thereon with which the wheels of a motor car may contact while the weight of the car is imposed thereon, such means being provided for each side of the car and each relatively movable with respect to or in unison with the other such means, a divided main shaft mounted on the support and having its respective sections separately connected with such dual movable means, a differential connecting the two sections and the casing of which is provided with a ring gear, a divided counter-shaft having one of its sections provided with a pinion meshing with the gear, means for floatably mounting the counter-shaft with respect to the main shaft, and power means acting on the other section of the counter-shaft to oppose power delivered from the motor of the car to such movable means, a conventional gear box connecting the sections of the counter-shaft, such power means including a power unit constituting a motor, and a fly wheel, both fixed on such other section of the counter-shaft, to float with such shaft, the power means and fly wheel operably associated with the counter-shaft for absorbing or delivering torque thereto, the value of the torque being measurable by the angular relation of the counter-shaft to the main shaft.

12. A testing apparatus, including in combination, means with which the wheels of a motor car may contact while the weight of the car is imposed thereon, such means being provided for each side of the car and each relatively angularly movable with respect to or in unison with the other such means, a torque member shiftable angularly with respect to its axis, power means carried by the torque member and connected with the two angularly movable means, such power means adapted to positively drive such means or to react thereon when the motor of the car is delivering power to the car wheels.

13. A testing apparatus, including in combination, a support, means mounted thereon with which the wheels of a motor car may contact while the weight of the car is imposed thereon, such means being provided for each side of the car and each relatively movable with respect to or in unison with the other such means, power transmitting means mounted on the support and connected with and adapted to operate such movable means or to be operated therefrom, to obtain such relative and unison movements of the movable means engaged with the car wheels, a torque member shiftable angularly with respect to its axis, and power means independent of the car, on the torque member, and acting to positively drive the power transmitting means or to react thereon when the motor of the car is delivering power to the car wheels.

14. A testing apparatus, including in combination, a support, means mounted thereon with which the wheels of a motor car may contact while the weight of the car is imposed thereon, such means being provided for each side of the car and each relatively movable with respect to or in unison with the other such means, a divided main shaft mounted on the support and having its respective sections separately connected with such dual movable means, a differential connecting the two sections and the casing of which is provided with a ring gear, a counter-shaft having a pinion meshing with the gear, means including a torque tube around the divided shaft for floatably mounting the counter-shaft with respect to the main shaft, and power means acting on the counter-shaft to oppose power delivered from the motor of the car to such movable means.

15. A testing apparatus, including in combination, a support, means mounted thereon with which the wheels of a motor car may contact while the weight of the car is imposed thereon, such means being provided for each side of the car and each relatively movable with respect to or in unison with the other such means, a divided main shaft mounted on the support and having its respective sections separately connected with such dual movable means, a differential connecting the two sections, a counter-shaft having operative connection with the differential, power means and variable speed change means between the power means and counter-shaft and acting on the counter-shaft for obtaining several speeds and for increasing or decreasing the torque range of the power unit, for measuring power.

16. A testing apparatus, including in combination, a support, means mounted thereon with which the wheels of a motor car may contact while the weight of the car is imposed thereon, such means being provided for each side of the car and each relatively movable with respect to or in unison with the other such means, a divided main shaft mounted on the support and having its respective sections separately connected with such dual movable means, a differential connecting the two sections, a counter-shaft having operative connection with the differential, means for floatably mounting the counter-shaft with respect to the main shaft so that it may move either way around with respect to the axis of the main shaft and still maintain its operative connection with the differential, power means acting on the counter-shaft to oppose power delivered from the motor of the car to such relatively movable means, and variable speed change means between the power means and counter-shaft and acting on the counter-shaft for obtaining several speeds.

17. A testing apparatus, including in combination, a support, means mounted thereon with which the wheels of a motor car may contact while the weight of the car is imposed thereon, such means being provided for each side of the car and each relatively movable with respect to or in unison with the other such means, a divided main shaft mounted on the support and having its respective sections separately connected with such dual movable means, a differential connecting the two sections, a divided counter-shaft having operative connection with the differential, means for floatably mounting the counter-shaft with respect to the main shaft so that it may move either way around with respect to the axis of the main shaft and still maintain its operative connection with the differential, variable speed change means connecting the sections of the divided counter-shaft for obtaining several speeds of that section of the counter-shaft which is connected with the differential, and power means acting on the speed change means to oppose power delivered from the motor of the car to such relatively movable means.

18. A testing apparatus, including in combination, means with which the wheels of a motor car may contact while the weight of the car is imposed thereon, such means being provided for each side of the car and each relatively angularly movable with respect to or in unison with the other such means, power transmitting means including a torque member in common with such movable means and responsive to the movements of such means, power means for reacting on the power transmitting means and on such movable means while the same are moving relatively or in unison, and means for measuring the torque when power is flowing from the wheels of the car through the torque member and when the flow of power is reversed.

19. A testing apparatus, including in combination, means with which the wheels of a motor car may contact while the weight of the car is imposed thereon, such means being provided for each side of the car and each relatively angularly movable with respect to or in unison with the other such means, power transmitting means connecting the movable means at each side and comprising a differential responsive to the angular or unison movements of the movable means, a ring gear fixed upon the casing of the differential, power means comprising a pinion in mesh with the gear and tending to travel thereon with a measurable effort corresponding to torque reaction while such movable means are moving relatively or in unison, and means for measuring the torque when power is flowing from the wheels of the car through the pinion and when the flow of power is reversed.

20. A testing apparatus, including in combination, means with which the wheels of a motor car may contact while the weight of the car is imposed thereon, such means being provided for each side of the car and each relatively angularly movable with respect to or in unison with the other such means, power transmitting means responsive to the angular or unison movements of the movable means, and in common therewith, such transmitting means including a ring gear, power means comprising a pinion in mesh with the gear and tending to travel thereon with a measurable effort corresponding to torque reaction, and means for measuring the torque when power is flowing from the wheels of the car through the pinion and when the flow of power is reversed.

21. A testing apparatus, including in combination, means with which the wheels of a motor car may contact while the weight of the car is imposed thereon, such means being provided for each side of the car and each relatively angularly movable with respect to or in unison with the other such means, power transmitting means responsive to the angular or unison movements of the movable means, and in common therewith, such transmitting means including a ring gear, power means comprising a pinion in mesh with the gear and tending to travel thereon with a measurable effort corresponding to torque reaction, a torque member supporting the pinion and having a movement corresponding with the range of movement of the pinion, and means acted upon by the torque member for measuring the torque when power is flowing from the wheels of the car through the torque member and when the flow of power is reversed.

22. A testing apparatus, including in combination, means with which the wheels of a motor car may contact while the weight of the car is imposed thereon, such means being provided for each side of the car and each relatively angularly movable with respect to or in unison with the other such means, power transmitting means responsive to the angular or unison movements of the movable means, and in common therewith, such transmitting means including a ring gear, power means comprising a pinion in mesh with the gear and tending to travel thereon with a measurable effort corresponding to torque reaction, a torque member supporting the pinion and having a reacting pressure in either direction corresponding with the flow of power from either the motor of the car or the motor of the power means, and means acted upon by the torque member for measuring the pressure in either direction.

23. A testing apparatus, including in combination, means with which the wheels of a motor car may contact while the weight of the car is imposed thereon, such means being provided for each side of the car and each relatively angularly movable with respect to or in unison with the other such means, power transmitting means responsive to the angular or unison movements of the movable means, and in common therewith, such transmitting means including a ring gear, power means comprising a pinion in mesh with the gear and tending to travel thereon with a measurable effort corresponding to torque reaction, the pinion having a normal position corresponding to the movement in unison of such movable means, a torque member supporting the pinion and movable when the pinion tends to travel, means under the control of the torque member for measuring the torque when power is flowing from the wheels of the car through the torque member and when the flow of power is reversed.

24. A testing apparatus, including in combination, means with which the wheels of a motor car may contact while the weight of the car is imposed thereon, such means being provided for each side of the car and each relatively angularly movable with respect to or in unison with the other such means, power transmitting means including a torque member and responsive to the angular or unison movements of the movable means, and in common therewith, such transmitting means including a ring gear, power means comprising a pinion supported by the torque member in mesh with the gear and tending to travel thereon, means for indicating the torque delivered from the torque member, and an instrument under the control of the torque member for measuring speed.

25. A testing apparatus, including in combination, means with which the wheels of a motor car may contact while the weight of the car is imposed thereon, such means being provided for each side of the car and each relatively angularly movable with respect to or in unison with the other such means, power transmitting means responsive to the angular or unison movements of the movable means, and in common therewith, such transmitting means including a ring gear, power means comprising a pinion in mesh with the gear and tending to travel thereon with a measurable effort corresponding to torque reaction, the pinion having a normal position corresponding to the movement in unison of such movable means, a torque member supporting the pinion and movable when the pinion tends to travel, and means under the control of the torque member for measuring torque in either direction of travel of the torque member and which torque is translatable separately into horse power output, power pull, braking force and compression.

26. A testing apparatus, including in combination, dual movable means with which the wheels of a motor car may contact in analyzing functional troubles of the car through the use of a dynamometer, a car runway leading to such movable means, and parallel guide lines extending along the runway in the direction of travel of the car and around the dual movable means for detecting misalignment of the front or rear axles of the car.

27. A testing apparatus, including in combination, dual movable means with which the wheels of a motor car may contact in analyzing functional troubles of the car through the use of a dynamometer, a car runway leading to such movable means, idler drums arranged in the runway in relation to such dual movable means, and parallel guide lines extending along the runway in the direction of travel of the car and around the dual movable means and the idler drums.

28. A testing apparatus, including in combination, dual movable means with which the wheels of a motor car may contact in analyzing functional troubles of the car through the use of a dynamometer, a mechanically balanced torque measuring dynamometer, including means for showing torque in both directions of car wheel rotation, and such torque means comprising a reversing device between the torque measuring scale and the actuating member of the dynamometer, a car runway leading to such movable means, idler drums arranged in the runway close to such dual movable means, and means for collectively preventing rotation of the idler drums to allow the car to be driven to or from testing position without affecting the dual means.

29. A testing apparatus, including in combination, dual movable means with which the wheels of a motor car may contact in analyzing functional troubles of the car through the use of a dynamometer, a car runway leading to such movable means, idler drums arranged in the runway close to such movable means, and means for selectively acting on the idler drums in either direction of car wheel rotation to impose a drag on either one of them in addition to applying a drag on both idler drums.

30. In a testing apparatus, the combination of dynamometric power mechanism including drums either of which revolve when the wheels of a motor car are in contact with the drums, metering means for showing speed, and metering means which is influenced by torque for showing horse power, the speed metering means being connected with the horse power metering means for control of the latter in proportion to the speed.

31. In a testing apparatus, the combination of dynamometric power mechanism including drums either of which revolve when the wheels of a motor car are in contact with the drums, a torque member controlled by the drums when they are so revolving, metering means for showing speed, metering means for showing horse power, and means for separately acting through the torque member upon both metering means, the speed metering means having a connection with the horse power meter for control of the latter in proportion to the speed.

32. A testing apparatus, comprising a dynamometer with a capacity for receiving simultaneously two wheels of a car and having a divided main shaft to operably connect with the two wheels to be tested, and including a single countershaft floatably mounted with respect to the divided sections of the main shaft and differentially connected with such sections, means for driving the single countershaft from either or both sections of the main shaft or vice versa, the driving or driven means maintaining the operable relation of the two sections of the main shaft at all times, and power means operable on the single countershaft for delivering torque flowing through the apparatus, and which torque is measurable during a difference of speed resulting from the angular relation of the sections of the main shaft, and means for maintaining a normal angular relationship when no torque is flowing.

33. A testing apparatus, comprising a dynamometer with a capacity for receiving simultaneously two wheels of a car and having a divided main shaft to operably connect with the two wheels to be tested, and including a single countershaft floatably mounted with respect to the divided sections of the main shaft and differentially connected with such sections, means for driving the single countershaft from either or both sections of the main shaft or vice versa, the driving of driven means maintaining the operable relation of the two sections of the main shaft at all times, and a flywheel differentially associated with the two shaft sections for absorbing or delivering torque thereto, the value of the torque being measurable during a difference of speed resulting from the angular relation of the sections of the main shaft.

34. A testing apparatus, comprising a dynamometer with a capacity for receiving simultaneously two wheels of a car and having a divided main shaft to operably connect with the two wheels to be tested, and including a single countershaft floatably mounted with respect to the divided sections of the main shaft and differentially connected with such sections, means for driving the single countershaft from either or both sections of the main shaft or vice versa, the driving or driven means maintaining the operable relation of the two sections of the main shaft at all times, power means and a fly-wheel differentially associated with the two shaft sections for absorbing or delivering torque thereto, the value of the torque being measurable during a difference of speed resulting from the angular relation of the sections of the main shaft.

35. A testing apparatus, comprising a dynamometer with a capacity for receiving simultaneously two wheels of a car and having a divided main shaft to operably connect with the two wheels to be tested, and including a single countershaft floatably mounted with respect to the divided sections of the main shaft and differentially connected with such sections, means for driving the single countershaft from either or both sections of the main shaft or vice versa, the driving or driven means maintaining the operable relation of the two sections of the main shaft at all times, and power means operable on the single countershaft for delivering torque flowing through the apparatus, and which torque is measurable during a difference of speed resulting from the angular relation of the sections of the main shaft, and means for maintaining a normal angular relationship when no torque is flowing, such power means include a variable speed change gear for changing the speed relationship thereof to the divided main shaft.

OTIS F. PRESBREY.